United States Patent
Yang (10) Patent No.: US 9,489,143 B2
(45) Date of Patent: Nov. 8, 2016

(54) METHOD FOR ACCESSING FLASH MEMORY AND ASSOCIATED CONTROLLER AND MEMORY DEVICE

(71) Applicant: Silicon Motion Inc., Hsinchu County (TW)

(72) Inventor: Tsung-Chieh Yang, Hsinchu (TW)

(73) Assignee: Silicon Motion Inc., Hsinchu County (TW)

( * ) Notice: Subject to any disclaimer, the term of this patent is extended or adjusted under 35 U.S.C. 154(b) by 0 days.

(21) Appl. No.: 14/617,955

(22) Filed: Feb. 10, 2015

(65) Prior Publication Data

US 2015/0234609 A1    Aug. 20, 2015

(30) Foreign Application Priority Data

Feb. 18, 2014   (TW) ............................. 103105359 A (51) Int. Cl.
```
G06F 12/00      (2006.01)
G06F 3/06       (2006.01)
G06F 12/02      (2006.01)
```
(52) U.S. Cl.
CPC ........... *G06F 3/0619* (2013.01); *G06F 3/0655* (2013.01); *G06F 3/0679* (2013.01); *G06F 12/0246* (2013.01); *G06F 2206/1014* (2013.01)

(58) Field of Classification Search
CPC ............. G06F 12/0246; G06F 3/0619; G06F 3/0655; G06F 3/0679; G06F 2206/1014
See application file for complete search history.

(56) References Cited

U.S. PATENT DOCUMENTS

| | | |
|---|---|---|
| 8,228,728 B1 | 7/2012 | Yang |
| 8,456,907 B2 | 6/2013 | Kim |
| 2012/0033492 A1 | 2/2012 | Chen |
| 2012/0099373 A1 | 4/2012 | Jung |
| 2013/0275658 A1 | 10/2013 | Han |
| 2013/0339584 A1 | 12/2013 | Chang |
| 2013/0339586 A1 | 12/2013 | Weingarten |
| 2014/0047160 A1 | 2/2014 | Lin |
| 2015/0170747 A1* | 6/2015 | Liu ..................... G11C 16/107 365/185.03 |

FOREIGN PATENT DOCUMENTS

| | | |
|---|---|---|
| KR | 1020100068364 A | 6/2010 |
| WO | 2009040785 | 4/2009 |

* cited by examiner

*Primary Examiner* — Shawn X Gu
(74) *Attorney, Agent, or Firm* — Winston Hsu; Scott Margo (57) ABSTRACT

The present invention provides a method for accessing a flash memory, wherein the flash memory is a Triple-Level Cell flash memory and each word line of the flash memory constitutes a least significant bit (LSB) page, a central significant bit (CSB) page and a most significant bit (MSB) page, each storage unit of each word line of the flash memory is implemented by a floating-gate transistor, and each storage unit supports at least eight write voltage levels, the method includes: generating dummy data according to data of a first page and a second page corresponding to a specific word line of the flash memory, wherein the dummy data is going to be written in a third page corresponding to the specific word line; and writing the data and the dummy data into the flash memory.

12 Claims, 6 Drawing Sheets

METHOD FOR ACCESSING FLASH MEMORY AND ASSOCIATED CONTROLLER AND MEMORY DEVICE

BACKGROUND OF THE INVENTION

1. Field of the Invention

The present invention is related to a flash memory, and more particularly, to a method for accessing flash memory and associated controller and memory device.

2. Description of the Prior Art

Flash memory can be electrically erased and programmed for data storage. It is widely applied in memory cards, solid-state drives, portable multimedia players, etc. As the flash memory is a non-volatile memory, no power is needed to maintain the information stored in the flash memory. In addition, the flash memory provides fast read access and better shock resistance. These characteristics explain the popularity of the flash memory.

The flash memories may be categorized into NOR-type flash memories and NAND-type flash memories. Regarding the NAND flash memory, it has reduced erasing and programming time and requires less chip area per cell, thus allowing greater storage density and lower cost per bit than the NOR flash memory. In general, the flash memory stores data in an array of memory cells made from floating-gate transistors. Each memory cell can store one bit of information or more than one bit of information by adequately controlling the number of electrical charge on its floating gate to configure the threshold voltage required for turning on the memory cell made of a floating-gate transistor. In this way, when one or more predetermined control gate voltages are applied to a control gate of the floating-gate transistor, the conductive status of the floating-gate transistor would indicate the binary digit(s) stored by the floating-gate transistor.

Flash memory can be categorized into Single-Level Cell (SLC), Multiple-Level Cell (MLC) or Triple-Level Cell (TLC) according to the type. In a TLC flash memory, each memory cell can be used to store three bits, so each memory cell supports eight write voltage levels. However, if there are quality problems when manufacturing flash memory and makes a portion of memory cells can't supports eight write voltage levels entirely (for example some higher voltage levels can't be written), or a portion of voltage levels of the eight write voltage levels have shift or sticky problems, a data writing error may be occurred, causing the problems of reading data.

In addition, if the manufacturer discards these flash memories which have quality problems, it also causes the waste of costs.

SUMMARY OF THE INVENTION

One of the objectives of the present invention is to provide a method for accessing flash memory and associated controller and memory device, which can change TLC flash memory to a MLC-like accessing type when TLC flash memory has quality problems to solve the aforementioned problems.

According to an embodiment of the present invention, disclosing a method for accessing a flash memory, wherein the flash memory is a TLC flash memory, each word line of the flash memory constitute a least significant bit (LSB) page, a central significant bit (CSB) page and a most significant bit (MSB) page, each storage unit of each word line of the flash memory is implemented by a floating-gate transistor and each storage unit supports at least eight write voltage levels, the method comprises: generating dummy data according to data of a first page and a second page corresponding to a specific word line of the flash memory, wherein the dummy data is going to be written into a third page corresponding to the specific word line, wherein the first page is one of the LSB page, the CSB page and the MSB page, the second page is another one of the LSB page, the CSB page and the MSB page, the third page is the other one of the LSB page, the CSB page and the MSB page; and writing the data and the dummy data into the flash memory.

According to another embodiment of the present invention, a memory device comprises a flash memory and a controller, wherein the flash memory is a TCL flash memory, each word line of the flash memory constitutes a least significant bit (LSB) page, a central significant bit (CSB) page and a most significant bit (MSB) page, each storage unit of each word line of the flash memory is implemented by a floating-gate transistor and each storage unit supports at least eight write voltage levels; and the controller is used to access the flash memory, wherein the controller generates dummy data according to data of a first page and a second page corresponding to a specific word line of the flash memory, wherein the dummy data is going to be written into a third page corresponding to the specific word line, wherein the first page is one of the LSB page, the CSB page and the MSB page, the second page is another one of the LSB page, the CSB page and the MSB page, and the third page is the other one of the LSB page, the CSB page and the MSB page; and the controller writes the data and the dummy data into the flash memory.

According to another embodiment, a controller of a memory device is disclosed, wherein the controller is used for accessing a flash memory, the flash memory is a TLC flash memory, each word line of the flash memory constitutes a least significant bit (LSB) page, a central significant bit (CSB) page and a most significant bit (MSB) page, each storage unit of each word line of the flash memory is implemented by a floating-gate transistor and each storage unit supports at least eight write voltage levels, and the controller comprises: a memory arranged to store a code; and a microprocessor arranged to execute the code to control the access of the flash memory; wherein the microprocessor generates dummy data according to data of a first page and a second page corresponding to a specific word line of the flash memory, wherein the dummy data is going to be written into a third page corresponding to the specific word line, wherein the first page is one of the LSB page, the CSB page and the MSB page, the second page is another one of the LSB page, the CSB page and the MSB page, the third page is the other one of the LSB page, the CSB page and the MSB page; and the microprocessor writes the data and the dummy data into the flash memory.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
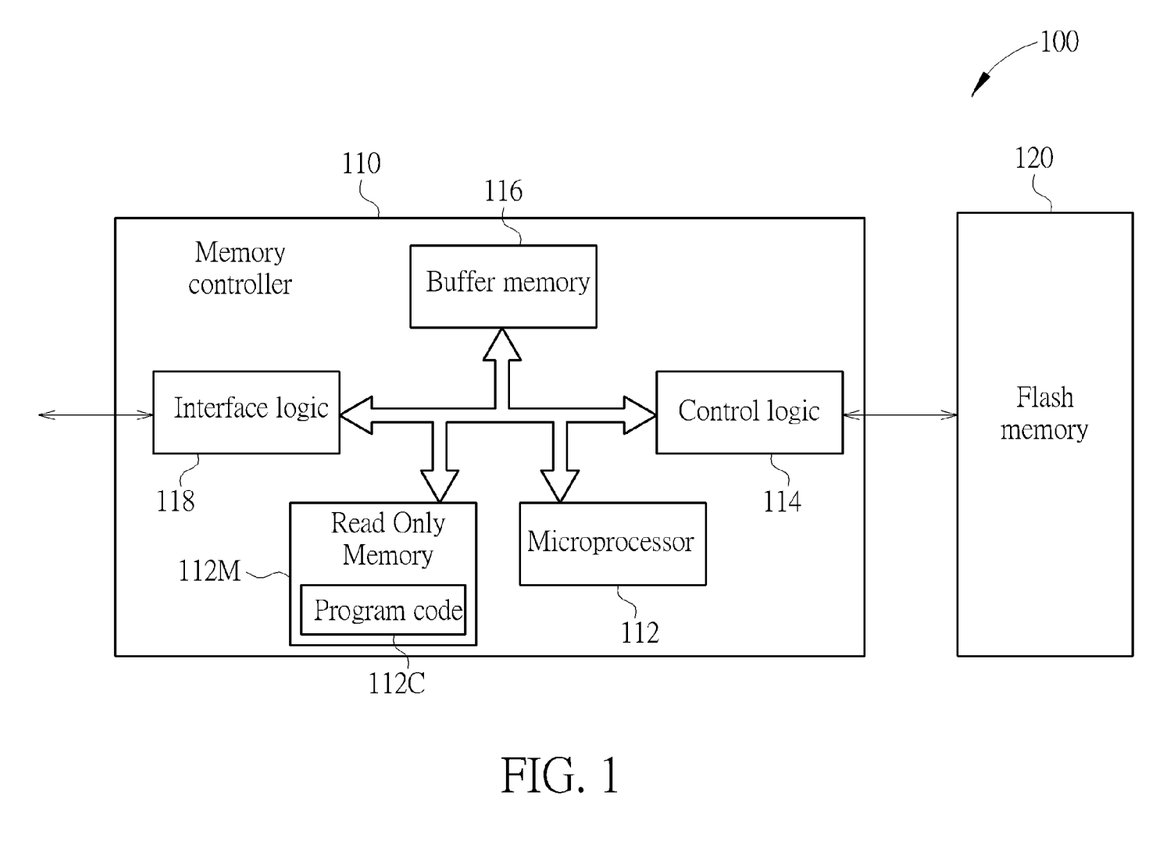
FIG. 1 is a diagram illustrating a memory device according to an embodiment of the present invention.

Refer to FIG. 1, which is a diagram illustrating a memory device 100 according to an embodiment of the present invention, wherein the memory device 100 of this embodiment is particularly a portable memory device (e.g. memory card complying with SD/MMC, CF, MS, XD standard). The memory device 100 comprises a flash memory 120 and a controller, the controller is a memory controller 110, and is arranged to access the flash memory 120. According to this embodiment, the memory controller 110 comprises a microprocessor 112, a read only memory (ROM) 112M, a control logic 114, a buffer memory 116, and an interface logic 118. The ROM 112M is used to store a program code 112C, and the microprocessor 112 is arranged to execute the program code 112C to control the access of the flash memory 120.

In typical situations, the flash memory 120 comprises a plurality of blocks, and the controller (e.g. the memory controller 110 executing the code 112C via the microprocessor 112) executes data copying, erasure and combining operations on the flash memory 120 by copying, erasing and combining in units of blocks. In addition, a block can record specific number of pages, wherein the controller (e.g. the memory controller 110 executing the code 112C via the microprocessor 112) executes data writing operation on the flash memory 120 by writing/programming in units of pages.

In practical, The memory controller 110 executing the code 112C via the microprocessor 112 can execute a lot of control operations by using internal elements For example the memory controller 110 utilizes the control logic 114 to control access to the flash memory 120 (particularly the access to at least one block or at least one page), utilizes the buffer memory 116 to perform the needed buffering process, and utilizes the interface logic 118 to communicate with a host device.

Figure 2:
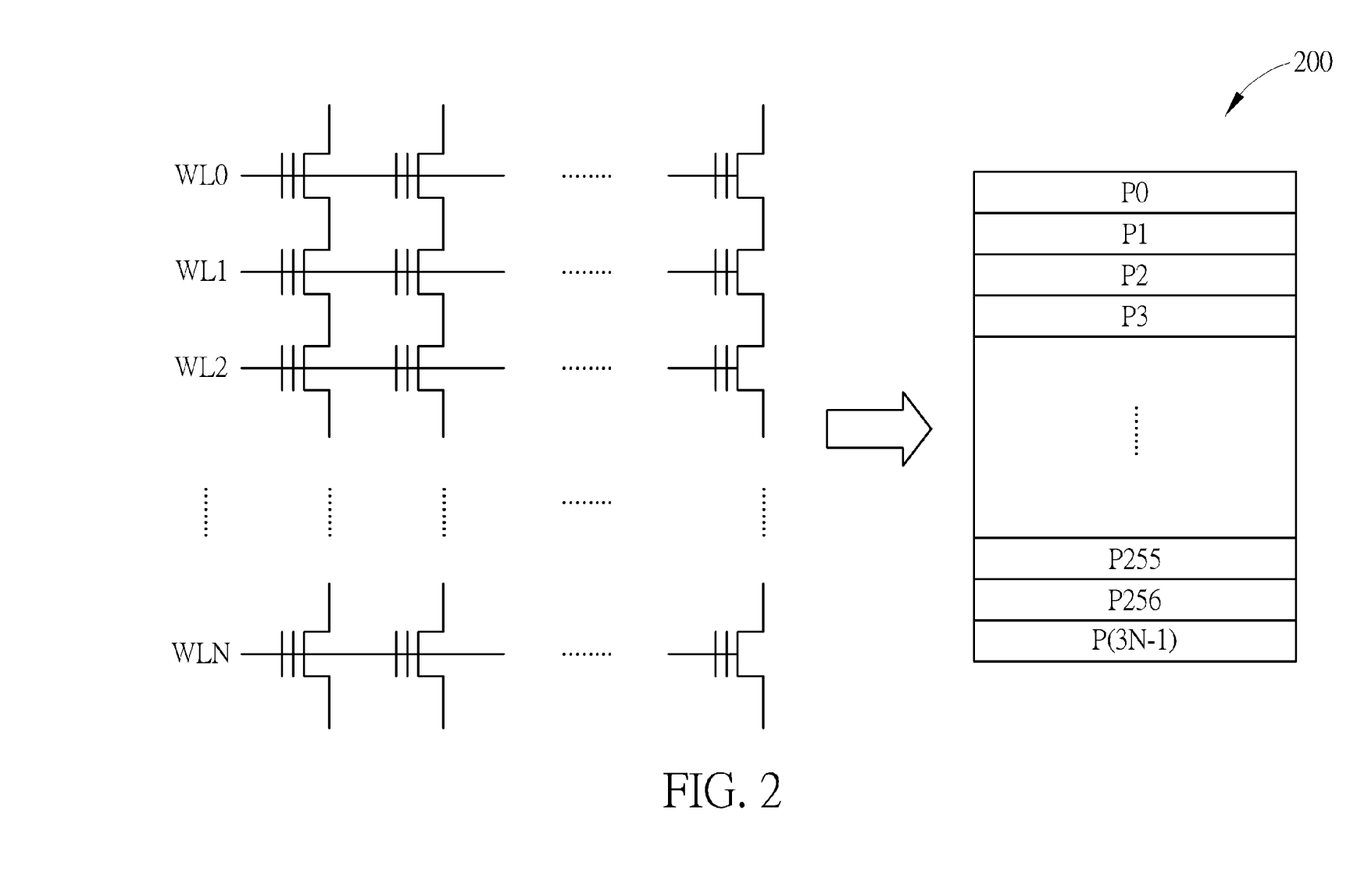
FIG. 2 is a diagram illustrating a block of flash memory according to an embodiment of the present invention.

Refer to FIG. 2, which is a diagram illustrating the block 200 of the flash memory 120 according to an embodiment of the present invention. As shown in FIG. 2, the block 200 is a TLC architecture, that is the block 200 has N word lines WL0 to WLN, and each word line can compose three pages, so the block 200 comprises 3*N pages in total (P0 to P(3N-1)). Each storage unit in FIG. 2 (i.e. each floating-gate transistor 202) can store three bits, i.e. the three bits comprising the LSB, the CSB and the MSB; and the LSBs stored in a plurality of storage units of each word line WL0 to WLN compose a first page corresponding to the word line. The stored CSBs compose a second page corresponding to the word line and the stored MSBs compose a third page corresponding to the word line.

Figure 3:
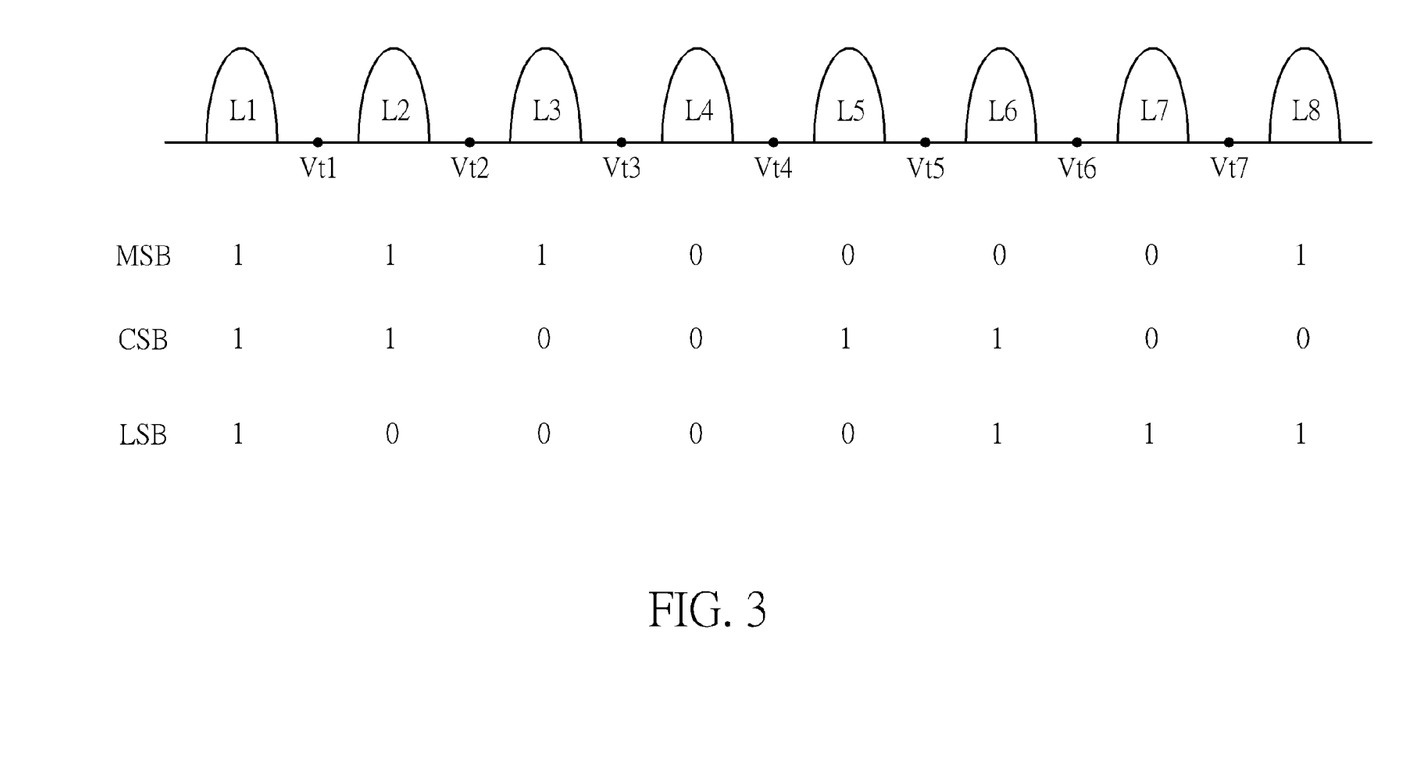
FIG. 3 is a diagram illustrating a plurality of write voltage levels and a plurality of threshold voltages of a page.

In detail, refer to FIG. 3, which is a diagram illustrating a plurality of write voltage levels L1 to L8 and a plurality of threshold voltages Vt1 to Vt7 of the pages (P0 to P(3N-1)). As shown in FIG. 3, each floating-gate transistor 202 can be programmed to have a voltage level L1 (i.e. (MSB, CSB, LSB)=(1, 1, 1)), a voltage level L2 (i.e. (MSB, CSB, LSB)=(1, 1, 0)), a voltage level L3 (i.e. (MSB, CSB, LSB)=(1, 0, 0)), a voltage level L4 (i.e. (MSB, CSB, LSB)=(0, 0, 0)), a voltage level L5 (i.e. (MSB, CSB, LSB)=(0, 1, 0)), a voltage level L6 (i.e. (MSB, CSB, LSB)=(0, 1, 1)), a voltage level L7 (i.e. (MSB, CSB, LSB)=(0, 0, 1)) or a voltage level L8 (i.e. (MSB, CSB, LSB)=(1, 0, 1)).

When the memory controller 110 needs to read the LSB of the floating-gate transistor 202, the memory controller 110 uses the threshold voltages Vt1 and Vt5 to read the floating-gate transistor 202, and decides the LSB is "1" or "0" according to the conductive status (whether there is a current or not) of the floating-gate transistor 202. In this embodiment, the floating-gate transistor 202 is turned on when memory controller 110 applies the threshold voltage Vt5 on the gate terminal of the floating-gate transistor 202 and/or the floating-gate transistor 202 is turned off when memory controller 110 applies the threshold voltage Vt1 on the gate terminal of the floating-gate transistor 202, means the LSB is "1"; the floating-gate transistor 202 is turned off when memory controller 110 applies the threshold voltage Vt5 on the gate terminal of the floating-gate transistor 202 and the floating-gate transistor 202 is turned on when memory controller 110 applies the threshold voltage Vt1 on the gate terminal of the floating-gate transistor 202, means the LSB is "0".

When the memory controller 110 needs to read the CSB of the floating-gate transistor 202, the memory controller 110 uses the threshold voltages Vt2, Vt4 and Vt6 to read the floating-gate transistor 202, and decides the CSB is "1" or "0" according to the conductive status (whether there is a current or not) of the floating-gate transistor 202. In this embodiment, the floating-gate transistor 202 is turned off when the memory controller 101 applies the threshold voltage Vt2 on the gate terminal of the floating-gate transistor 202, means the CSB is "1"; the floating-gate transistor 202 is turned off when the memory controller 110 applies the threshold voltage Vt4 on the gate terminal of the floating-gate transistor 202, but the floating-gate transistor 202 is turned on when the memory controller 101 applies the threshold voltage Vt2 on the gate terminal of the floating-gate transistor 202, means the CSB is "1"; the floating-gate transistor 202 is turned off when the memory controller 110 applies the threshold voltage Vt6 on the gate terminal of the floating-gate transistor 202, but the floating-gate transistor 202 is turned on when the memory controller 110 applies the threshold voltage Vt4 on the gate terminal of the floating-gate transistor 202, means the CSB is also "1"; the floating-gate transistor 202 is turned on when the memory controller 101 applies the threshold voltage Vt6 on the gate terminal of the floating-gate transistor 202, means the CSB is "0".

When the memory controller 110 needs to read the MSB of the floating-gate transistor 202, the memory controller 110 uses the threshold voltages Vt3 and Vt7 to read the floating-gate transistor, and decides the MSB is "1" or "0" according to the conductive status (whether there is a current or not) of the floating-gate transistor 202. In this embodiment, the floating-gate transistor 202 is turned on when the memory controller 110 applies the threshold voltage Vt7 on the gate terminal of the floating-gate transistor 202 and/or the floating-gate transistor 202 is turned off when the memory controller 110 applies the threshold voltage Vt3 on the gate terminal of the floating-gate transistor 202, means the MSB is "1"; the floating-gate transistor 202 is turned off when the memory controller 110 applies the threshold voltage Vt7 on the gate terminal of the floating-gate transistor 202, but the floating-gate transistor 202 is turned on when the memory controller 110 applies the threshold voltage Vt3 on the gate terminal of the floating-gate transistor 202, means the MSB is "0".

When the flash memory 120 leaves factory (before being manufactured to the memory device 100), the flash memory 120 is tested to determine if the flash memory 120 has problems when reading or writing. For example, the floatgate transistor 202 of the flash memory might not have the write voltage levels L6 to L8 due to the producing quality issue. In this way, if the memory controller 110 still tries to write the data into the flash memory 120 with the write voltage levels L6 to L8, an error of the voltage level of the floating-gate transistor 202 of the flash memory 120 will occur, causing following data reading problem.

Figure 4:
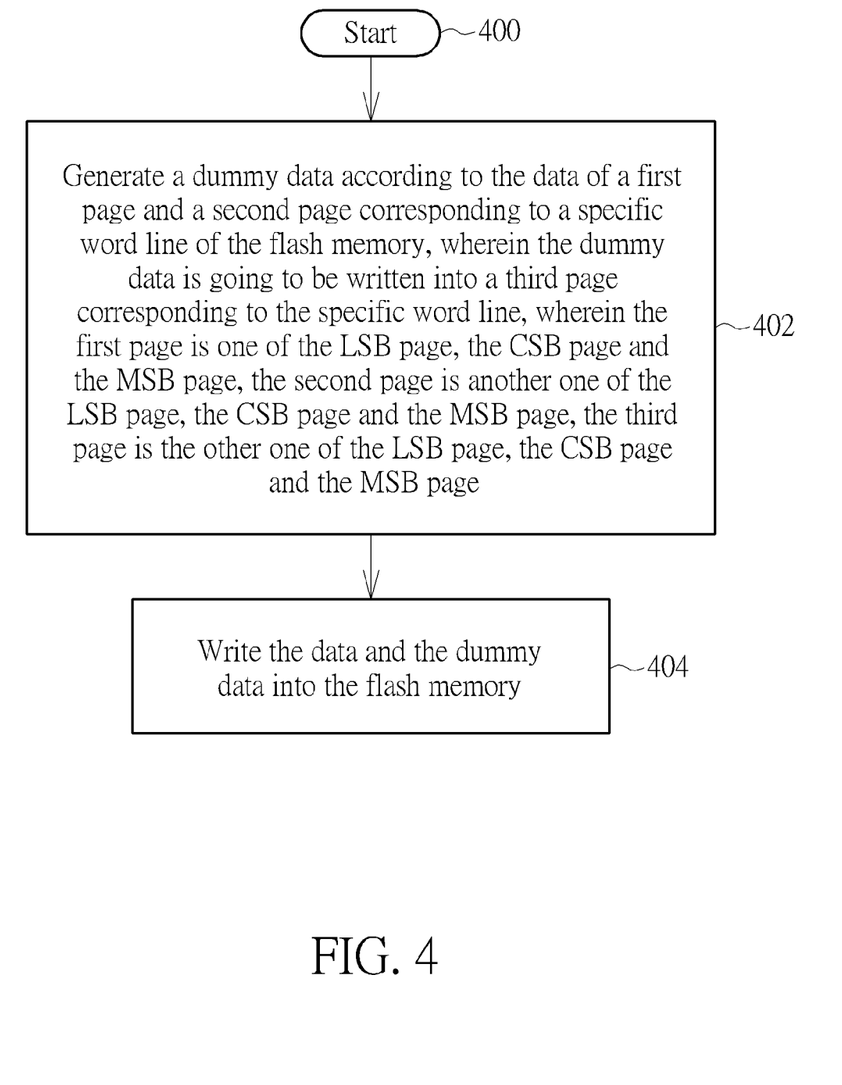
FIG. 4 is a flowchart illustrating the method for accessing flash memory according to an embodiment of the present invention.

To solve this problem, when the flash memory 120 is determined that it has quality problem when it leaves factory and cause that the flash memory 120 is not suitable to use TLC to store data, the memory controller 110 of the present invention changes the original TLC flash memory to a MLC-like accessing type by setting to make the flash memory 120 won't occur error for the following reading operation. Refer to FIG. 4, which is a flowchart illustrating a method for accessing the flash memory 120. Refer to FIG. 4, the flow is described as follows.

Step 400: the flow starts.

Step 402: generate a dummy data according to the data of a first page and a second page corresponding to a specific word line of the flash memory, wherein the dummy data is going to be written into a third page corresponding to the specific word line, wherein the first page is one of the LSB page, the CSB page and the MSB page, the second page is another one of the LSB page, the CSB page and the MSB page, the third page is the other one of the LSB page, the CSB page and the MSB page;

Step 404: write the data and the dummy data into the flash memory.

Figure 5:
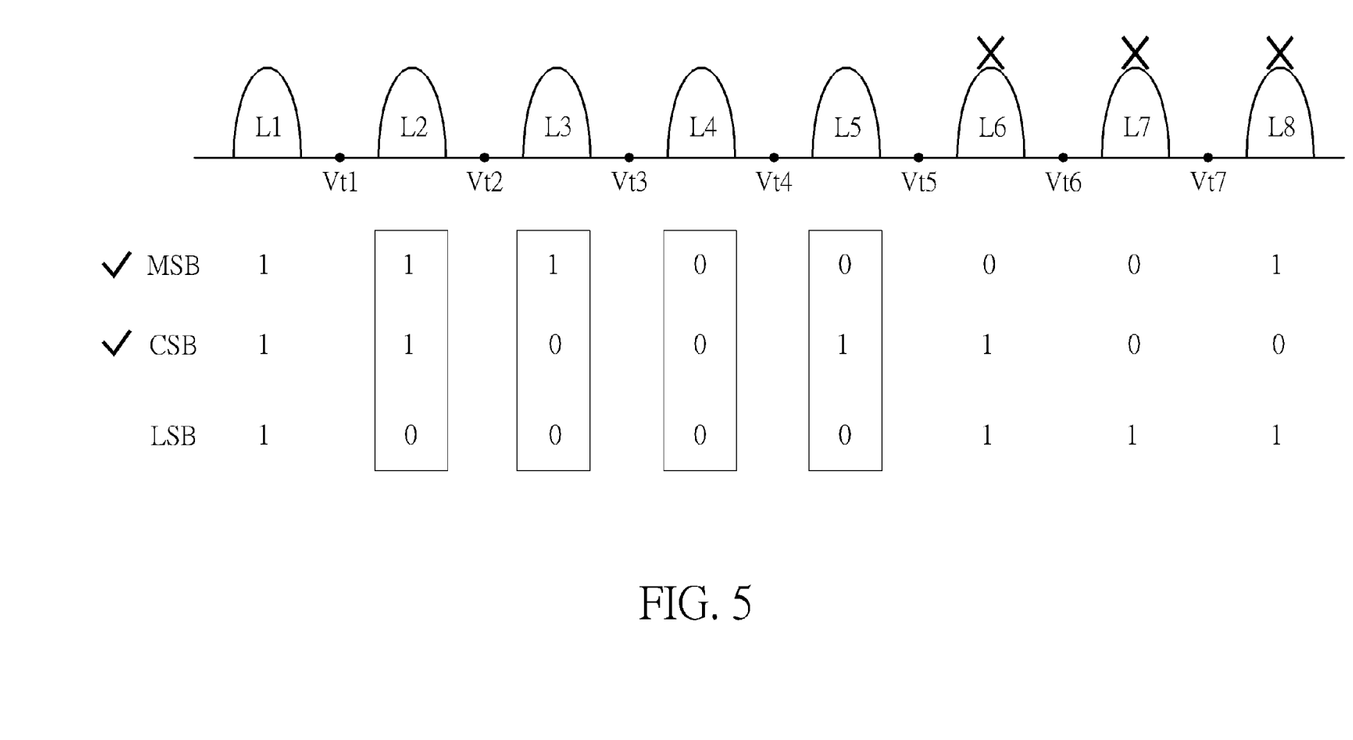
FIG. 5 is a diagram illustrating the write voltage levels L6 to L8 can't be written into due to the poor producing quality of the floating-gate of the flash memory.

Refer to the example in FIG. 5 to further understand the flow in FIG. 4. In the example in FIG. 5, it assumes the floating-gate transistor 202 of the flash memory 120 cannot have the write voltage levels L6 to L8 due to the poor producing quality, therefore, substantially, only the write voltage levels L1 to L5 can be correctly used in this embodiment. In this way, owing to the floating-transistor 202 of the flash memory 120 only has five write voltage levels, therefore the flash memory 120 can't store data as TLC anymore (TLC needs eight write voltage levels). To solve this problem, the memory controller 110 of the present invention changes the flash memory 120 to a MLC-like accessing type on design, that is the memory controller 110 merely stores data from a host device to two pages corresponding to a word line, and because the three pages (the LSB page, the CSB page and the MSB page) need to be written in the same time, therefore the memory controller 110 further generates a dummy data which is going to be written into the third page according to the data which is going to be written into the above-mentioned two pages, and writes the data and the dummy data into the storage unit (floating-gate transistor 202) of the word line.

More specifically, on the design of the memory controller 110, the first thing needs to consider is which two pages should be chosen. Because the memory controller 110 of the present invention changes the flash memory 120 to a MLClike accessing type on design therefore each storage unit of the two pages has to have the write voltage level corresponding to four combinations of bits (1, 1), (1, 0), (0, 1), (0, 0). In the embodiment of FIG. 5, for the CSB and the LSB, because in the write voltage levels L1 to L5, the CSB and the LSB only have combinations of bits (1, 1), (1, 0), (0, 0), and lack of the combination of bits (0, 1), therefore the CSB page and the LSB page can't be the two pages chosen by MLC; next, for the MSB and the LSB, the MSB and the LSB only have combinations of bits (1, 1), (1, 0), (0, 0), and lack of combination of bits (0, 1) therefore the MSB page and the LSB page can't be the two pages chosen by MLC either; finally, for the MSB and the CSB, because the MSB and the CSB have four combinations of bits (1, 1), (1, 0), (0, 1), (0, 0), therefore the MSB page and the CSB page can be the two pages chosen by MLC. Like the above statements, in the embodiment of FIG. 5, the memory controller 110 writes data into the MSB page and the CSB page when meaningful data needs to be written into the flash memory 120.

Explaining with the embodiment in FIG. 5, because the memory controller 110 uses the MLC-like accessing type to access the flash memory 120, therefore the memory controller 110 uses only four specific voltage levels L2 to L5 of the write voltage levels L1 to L8 to write data into the floating-gate transistor 202. The memory controller 110 generates a dummy bit "0" which is going to be written into the LSB when the memory controller 110 needs to write bits "1" and "1" into the MSB and the CSB of a storage unit respectively to make memory controller 110 use write voltage level L2 to write data into the storage unit; in addition, the memory controller 110 generates a dummy bit "0" which is going to be written into the LSB when the memory controller 110 needs to write bits "1" and "0" into the MSB and the CSB of a storage unit respectively to make memory controller 110 use write voltage level L3 to write data into the storage unit; and the memory controller 110 generates a dummy bit "0" which is going to be written into the LSB when the memory controller 110 needs to write bit "0" and "0" into the MSB and the CSB of a storage unit respectively to make memory controller 110 use write voltage level L4 to write data into the storage unit; the memory controller 110 generates a dummy bit "0" which is going to be written into the LSB when the memory controller 110 needs to write bit "0" and "1" into the MSB and the CSB of a storage unit respectively to make memory controller 110 use write voltage level L5 to write data into the storage unit Like the above statements, because in the three pages corresponding to each word line of the flash memory 120, only the MSB page and the CSB page are used to store meaningful data, therefore in a situation that the stored data is from a host device, only the MSB page and the CSB page of the flash memory 120 have the logical addresses corresponding to the host device, and the LSB page doesn't have the logical address corresponding to the host device. Therefore, when the memory controller 110 needs to read the data of the flash memory 120 (for example, receiving a reading request from the host device), the memory controller 110 only reads the MSB page and the CSB page but the LSB page.

In addition, the method for the memory controller 110 reading the flash memory 120 doesn't need to change, that is the memory controller 110 still uses the threshold voltages Vt2, Vt4 and Vt6 to read the floating-gate transistor 202 to decide the CSB, and the memory controller 110 uses the threshold voltages Vt3 and Vt7 to read the floating-gate transistor 202 to decide the MSB.

Because the present invention can change the flash memory 120 which has poor quality and can't use TLC to a MLC-like accessing type, therefore it can utilize the flash memory which is supposed to be discarded more effectively. In addition, the memory controller 110 doesn't need to change too much on design, therefore the design costs of the memory controller 110 is reduced.

In addition, although in the explanation of the embodiment of FIG. 5, the memory controller 110 uses four specific write voltage levels L2 to L5 to write data into the floating-gate transistor 202, however, in other embodiments of the present invention, because the write voltage level L1 and the write voltage level L2 represent the same bit values on the CSB and the MSB therefore the four specific write voltage levels in the above embodiment can also be L1 and L3 to L5. Because the skilled person in this art can understand the implementing method after reading the above explanation, so the details are omitted for brevity.

In addition, in above explanation, the memory controller 110 changes all the flash memory 120 to a MLC-like accessing type, however, in other embodiments of the present invention, the flash memory 120 can choose using TLC or MLC in unit of block. For example, the flash memory 120 will be tested when it leaves factory to decide which block might have quality problems and which block doesn't. For those blocks with quality problems, the memory controller 110 can use above-mentioned MLC-like accessing type to access these blocks; and for those blocks without quality problems, the memory controller 110 can use traditional TLC to access those blocks.

Figure 6:
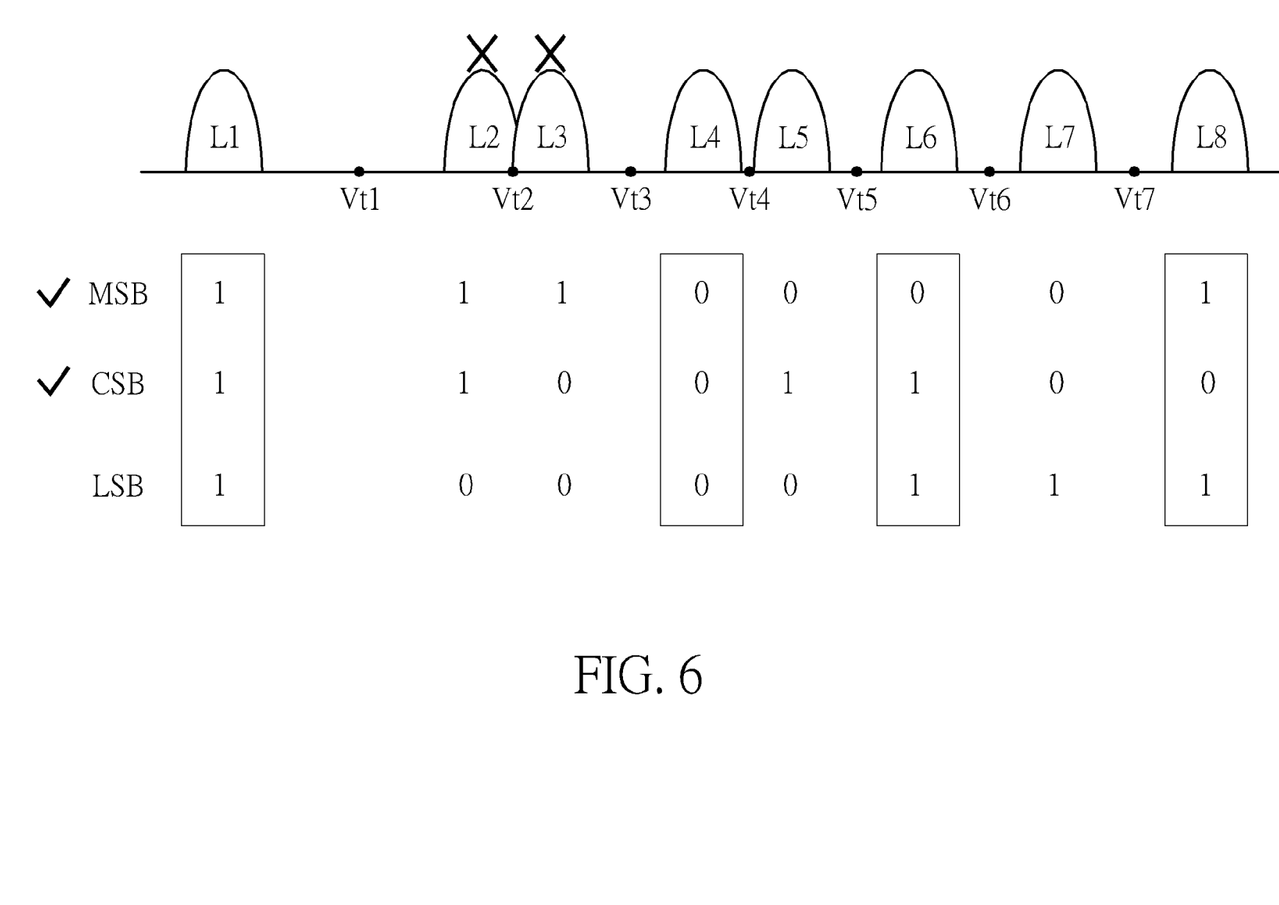
FIG. 6 is a diagram illustrating the write voltage levels L2 and L3 have sticky situation due to the poor producing quality of the floating-gate transistor of the flash memory.

In addition, refer to FIG. 6, which illustrating the write voltage levels L2 and L3 have sticky situation due to the poor producing quality of the floating-gate transistor 202 of the flash memory 120, therefore substantially only the write voltage levels L1 and L4 to L8 can be correctly used in the embodiment of FIG. 6. In this way, because the floating-gate transistor 202 of the flash memory 120 only has six write voltage levels, therefore the flash memory 120 can't store data as TLC anymore (TLC needs eight write voltage levels). To solve this problem, the memory controller 110 of the present invention changes the flash memory 120 to a MLC-like accessing type on design, that is memory controller 110 stores data from host device to two pages corresponding to a word line, and because the three pages (the LSB page, the CSB page and the MSB page) of the word line need to be written in the same time, therefore the memory controller 110 further generates dummy data which is going to be written into the third page according to the data which is going to be written into the above-mentioned two pages, and writes the data and the dummy data into the storage unit (floating-gate transistor 202) of the word line.

Similar to the embodiment of FIG. 5, on the design of the memory controller 110, the first thing needs to consider is which two pages should be chosen. Because the memory controller 110 of the present invention changes the flash memory 120 to a MLC-like accessing type on design therefore each storage unit of the two pages has to have the write voltage level corresponding to four combinations of bits (1, 1), (1, 0), (0, 1), (0, 0). In the embodiment of FIG. 5, for the CSB and the LSB, because in the write voltage levels L1 and L4 to L8, the CSB and the LSB have four combinations of bits (1, 1), (1, 0), (0, 1), (0, 0) therefore the CSB page and the LSB page can be the two pages chosen by MLC; next, for the MSB and the LSB, the MSB and the LSB only have combinations of bits (1, 1), (0, 1), (0, 0), and lack of the combination of bits (1, 0), therefore the MSB page and the LSB page can't be the two pages chosen by MLC; final, for the MSB and the CSB, because the MSB and the CSB have combinations of bits (1, 1), (1, 0), (0, 1), (0, 0) therefore the MSB page and the CSB page can be chosen by MLC too. Like the above-mentioned statements, in the embodiment of FIG. 6, the memory controller 110 can write data into the CSB page and the LSB page in FIG. 6 or into the MSB page and the CSB page FIG. 6 when meaningful data needs to be written into the flash memory 120.

Explaining with the embodiment in FIG. 6, assuming that the designer chooses using the MSB and the CSB, then the memory controller 110 uses only four specific write voltage levels of the write voltage levels L1 to L8 to write data into the floating-gate transistor 202, and these four specific write voltage levels can be L1, L4, L6, and L8 (this is not a limitation of the present invention, the four write voltage levels can also be L1, L5, L7, and L8). More specifically, when the memory controller 110 needs to write bits "1", "1" into the MSB and the CSB of a storage unit respectively, the memory controller 110 generates a dummy bit "1" which is going to be written into the LSB to make the memory controller 110 use the write voltage level L1 to write the data into the storage unit; in addition, when the memory controller 110 needs to write bits "1", "0" into the MSB and the CSB of a storage unit respectively, the memory controller 110 generates a dummy bit "1" which is going to be written into the LSB to make the memory controller 110 use the write voltage level L8 to write the data into the storage unit; and when the memory controller 110 needs to write bits "0", "0" into the MSB and the CSB of a storage unit respectively, the memory controller 120 generates a dummy bit "0" which is going to be written into the LSB to make the memory controller 110 use the write voltage level L4 to write the data into the storage unit; when the memory controller 110 needs to write bits "0", "1" into the MSB and the CSB of a storage unit respectively, the memory controller 110 generates a dummy bit "1" which is going to be written into the LSB to make the memory controller 110 use the write voltage level L6 to write the data into the storage unit.

In addition, in the embodiment of FIG. 6, choosing the CSB and the LSB can also implement the operation, so the designer can also choose using the CSB and the LSB to conduct the design of the memory controller 110. Because the skilled person in the art can understand the implementing method of after reading the above-mentioned disclosure, so the detail descriptions are omitted here for brevity.

Briefly summarized, in the method of accessing flash memory and associated controller and memory device in the present invention, the flash memory can be changed to a MLC-like accessing type when the TLC flash memory has quality problems. Therefore it can utilize the flash memory which is supposed to be discarded effectively. In addition, changing the flash memory to MLC-like accessing type can also improve the quality of writing data, in case the problems of reading following data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for accessing a flash memory, wherein the flash memory is a Triple-Level Cell flash memory and each word line of the flash memory constitutes a least significant bit (LSB) page, a central significant bit (CSB) page and a most significant bit (MSB) page, each storage unit of each word line of the flash memory is implemented by a floating-gate transistor, and each storage unit supports at least eight write voltage levels, the method comprising:

generating dummy data according to data of a first page and a second page corresponding to a specific word line of the flash memory, wherein the dummy data is going to be written in a third page corresponding to the specific word line, wherein the first page is one of the LSB page, the CSB page and the MSB page corresponding to the specific word line, the second page is another one of the LSB page, the CSB page and the MSB page corresponding to the specific word line, and the third page is the other one of the LSB page, the CSB page and the MSB page corresponding to the specific word line; and writing the data and the dummy data into the flash memory;

wherein the step of generating the dummy data according to the data of the first page and the second page corresponding to the specific word line of the flash memory comprising:

for any storage unit of the specific word line, determining a bit value corresponding to the third page according to a combination of bits of the first page and the second page.

2. The method of claim 1, wherein the step of writing the data and the dummy data into the flash memory comprises:

utilizing only four specific write voltage levels of the eight write voltage levels to write the data and the dummy data into the flash memory.

3. The method of claim 2, wherein four combinations of bits of the first page and the second page corresponding to the four specific voltage levels are (1, 1), (1, 0), (0, 1), (0, 0) respectively.

4. The method of claim 1, wherein the data of the first page and the second page corresponding to the specific word line of the flash memory is from a host device, and the third page doesn't have a logic address of the host device.

5. A memory device, which comprising:

a flash memory, wherein the flash memory is a Triple-Level Cell flash memory and each word line of the flash memory constitutes a least significant bit (LSB) page, a central significant bit (CSB) page and a most significant bit (MSB) page, each storage unit of each word line of the flash memory is implemented by a floating-gate transistor, and each storage unit supports at least eight write voltage levels; and a controller arranged to access the flash memory;

wherein the controller generates dummy data according to data of a first page and a second page corresponding to a specific word line of the flash memory, wherein the dummy data is going to be written into a third page corresponding to the specific word line, wherein the first page is one of the LSB page, the CSB page and the MSB page corresponding to the specific word line, the second page is another one of the LSB page, the CSB page and the MSB page corresponding to the specific word line, and the third page is the other one of the LSB page, the CSB page and the MSB page corresponding to the specific word line; and the controller writes the data and the dummy data into the flash memory; wherein for any storage unit of the specific word line, the controller determines a bit value corresponding to the third page according to a combination of bits of the first page and the second page.

6. The memory device of claim 5, wherein the controller uses only four specific write voltage levels of the eight write voltage levels to write the data and the dummy data into the flash memory.

7. The memory device of claim 6, wherein four combinations of bits of the first page and the second page corresponding to the four specific voltage levels are (1, 1), (1, 0), (0, 1), (0, 0) respectively.

8. The memory device of claim 5, wherein the data of the first page and the second page corresponding to the specific word line of the flash memory is from a host device, and the third page doesn't have a logic address of the host device.

9. A controller of memory device, wherein the controller is arranged to access a flash memory, the flash memory is a Triple-Level Cell flash memory and each word line of the flash memory constitutes a least significant bit (LSB) page, a central significant bit (CSB) page and a most significant bit (MSB) page, each storage unit of each word line of the flash memory is implemented by a floating-gate transistor, and each storage unit supports at least eight write voltage levels, and the controller comprises:

a memory arranged to store a program code;

a microprocessor arranged to execute the program code to control access of the flash memory;

wherein the microprocessor generates dummy data according to data of a first page and a second page corresponding to a specific word line of the flash memory, wherein the dummy data is going to be written in a third page corresponding to the specific word line, wherein the first page is one of the LSB page, the CSB page and the MSB page corresponding to the specific word line, the second page is another one of the LSB page, the CSB page and the MSB page corresponding to the specific word line, and the third page is the other one of the LSB page, the CSB page and the MSB page corresponding to the specific word line; and the microprocessor writes the data and the dummy data into the flash memory; wherein for any storage unit of the specific word line, the microprocessor determines a bit value corresponding to the third page according to a combination of bits of the first page and the second page.

10. The controller of claim 9, wherein the microprocessor uses only four specific write voltage levels of the eight write voltage levels to write the data and the dummy data into the flash memory.

11. The controller of claim 10, wherein four combinations of bits of the first page and the second page corresponding to the four specific voltage levels are (1, 1), (1, 0), (0, 1), (0, 0) respectively.

12. The controller of claim 9, wherein the data of the first page and the second page corresponding to the specific word line of the flash memory is from a host device, and the third page doesn't have a logic address of the host device.

* * * * *